US010867434B2

(12) United States Patent
Nevraev et al.

(10) Patent No.: US 10,867,434 B2
(45) Date of Patent: Dec. 15, 2020

(54) VARIABLE RATE SHADING

(71) Applicant: Microsoft Technology Licensing, LLC, Redmond, WA (US)

(72) Inventors: Ivan Nevraev, Redmond, WA (US); Martin J. I. Fuller, Warwick (GB); Mark S. Grossman, Palo Alto, CA (US); Jason M. Gould, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/730,662

(22) Filed: Dec. 30, 2019

(65) Prior Publication Data

US 2020/0134913 A1 Apr. 30, 2020

Related U.S. Application Data

(63) Continuation of application No. 16/178,386, filed on Nov. 1, 2018, now Pat. No. 10,559,124, which is a continuation of application No. 15/629,997, filed on Jun. 22, 2017, now Pat. No. 10,147,227.

(60) Provisional application No. 62/460,496, filed on Feb. 17, 2017.

(51) Int. Cl.
| | |
|---|---|
| *G06T 15/80* | (2011.01) |
| *G06T 15/04* | (2011.01) |
| *G06T 11/40* | (2006.01) |
| *G06T 15/00* | (2011.01) |

(52) U.S. Cl.
CPC .............. *G06T 15/80* (2013.01); *G06T 11/40* (2013.01); *G06T 15/005* (2013.01); *G06T 15/04* (2013.01)

(58) Field of Classification Search
CPC ....... G06T 15/80; G06T 11/40; G06T 15/005; G06T 15/04
See application file for complete search history.

(56) References Cited

U.S. PATENT DOCUMENTS

2016/0049000 A1* 2/2016 Patney ..................... G06T 1/20
345/426

OTHER PUBLICATIONS

Ragan-Kelley et al., Decoupled Sampling for Graphics Pipelines, ACM Transactions on Graphics, vol. 30, No. 3, Article 17, May 2011, 17 pages. (Year: 2011).*

* cited by examiner

*Primary Examiner* — Haixia Du
(74) *Attorney, Agent, or Firm* — Arent Fox LLP

(57) ABSTRACT

Methods and devices for rendering graphics in a computer system include a graphical processing unit (GPU) with a flexible, dynamic, application-directed mechanism for varying the rate at which fragment shading is performed for rendering an image to a display. In particular, the described aspects include determining, at a rasterization stage, map coordinates based on coarse scan converting a primitive of an object, the map coordinates indicating a location on a sampling rate parameter (SRP) map of a fragment within the primitive of the object, and identifying a lookup value for the fragment within the primitive of the object based at least on map coordinates, and calculating a respective fragment variable SRP value for the fragment within the primitive of the object based at least on the lookup value.

18 Claims, 11 Drawing Sheets

| Tile # | SRPtile uses |
|---|---|
| T1 | MAX(v1, a, b) |
| T2 | MAX(a,b,c,d,e,f) |
| T3 | MAX(e,f,g,h) | du/dx0 = u1-u0
du/dx1 = u1-u0
du/dx2 = u3-u2
du/dx3 = u3-u2
SRP0=0.5  SRP2=2  SRP3=2 du/dx0' = dudx0*SRP0
du/dx2a' = dudx2*SRP2
du/dx2b' = dudx2*SRP2
du/dx3a' = dudx3*SRP3
du/dx3b' = dudx3*SRP3

VARIABLE RATE SHADING

CROSS REFERENCE TO RELATED APPLICATIONS

The present Application for Patent is a continuation of U.S. patent application Ser. No. 16/178,386 entitled "VARIABLE RATE SHADING" filed Nov. 1, 2018, which is a continuation of U.S. application Ser. No. 15/629,997 entitled "VARIABLE RATE SHADING" filed Jun. 22, 2017, and claims priority to U.S. Application No. 62/460,496 entitled "VARIABLE RATE SHADING" filed Feb. 17, 2017, which are assigned to the assignee hereof and hereby expressly incorporated by reference herein.

BACKGROUND

The present aspects relate to a computer device, and more particularly, to performing variable sample rate shading in rendering graphics on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel. The prior art typically uses a constant sampling rate within the graphics pipeline for rendering an entire frame. Because of the desire for high-fidelity images, pixel shading is typically performed at a per-pixel rate, or at the rate of N samples per pixel if N-multisample anti-aliasing is required. Thus, the computer device operates the graphics pipeline to convert information about 3D objects into a bit map that can be displayed, and this process requires considerable memory and processing power.

There are continuing increases in pixel density and display resolution, and a continuing desire for power reduction in mobile display devices, like the HOLOLENS holographic headset device by MICROSOFT CORPORATION. Therefore, there is a need in the art for more efficient graphics processing in a computer device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of rendering graphics in a computer system, including determining, by a GPU at a rasterization stage, map coordinates based on coarse scan converting a primitive of an object, the map coordinates indicating a location on a sampling rate parameter (SRP) map of a fragment within the primitive of the object. Further, the method includes identifying, by the GPU at the rasterization stage, a lookup value for the fragment within the primitive of the object based at least on the map coordinates. Further, the method includes calculating, by the GPU at the rasterization stage, a respective fragment variable SRP value for the fragment within the primitive of the object based at least on the lookup value. Additionally, the method includes shading, by the GPU at a pixel shader stage, the fragment within the primitive of the object based on the respective fragment variable SRP value.

In another aspect, a computer device includes a memory and a graphics processing unit (GPU) in communication with the memory. The GPU is configured to determine, at a rasterization stage, map coordinates based on coarse scan converting a primitive of an object, the map coordinates indicating a location on a SRP map of a fragment within the primitive of the object. Further, the GPU is configured to identify, at the rasterization stage, the lookup value for the fragment within the primitive of the object based at least on the map coordinates. Further, the GPU is configured to calculate, at the rasterization stage, a respective fragment variable SRP value for the fragment within the primitive of the object based at least on the lookup value. Additionally, the GPU is configured to shade, at a pixel shader stage, the fragment within the primitive of the object based on the respective fragment variable SRP value.

In a further aspect, a computer-readable medium storing computer-executable instructions executable by a processor for rendering graphics in a computer device includes various instructions. The computer-readable medium includes instructions for determining, by a GPU at a rasterization stage, map coordinates based on coarse scan converting a primitive of an object, the map coordinates indicating a location on a SRP map of a fragment within the primitive of the object. Further, computer-readable medium includes instructions for identifying, by the GPU at the rasterization stage, a lookup value for the fragmens within the primitive of the object based at least on the map coordinates. Also, the computer-readable medium includes instructions for calculating, by the GPU at the rasterization stage, a respective fragment variable SRP value for the fragment within the primitive of the object based at least on the lookup value. Additionally, the computer-readable medium includes instructions for shading, by the GPU at a pixel shader stage, the fragment within the primitive of the object based on the respective fragment variable SRP value.

Additional advantages and novel features relating to aspects of the present invention will be set forth in part in the description that follows, and in part will become more apparent to those skilled in the art upon examination of the following or upon learning by practice thereof.

DESCRIPTION OF THE FIGURES

In the drawings:

FIG. 3-1 is a flowchart of an example of a method of rendering an image based on operation of the graphics pipeline according to the described aspects;

FIG. 3-2 is a flowchart of another example of a method of rendering an image based on operation of the graphics pipeline according to the described aspects;

DETAILED DESCRIPTION

Figure 1:
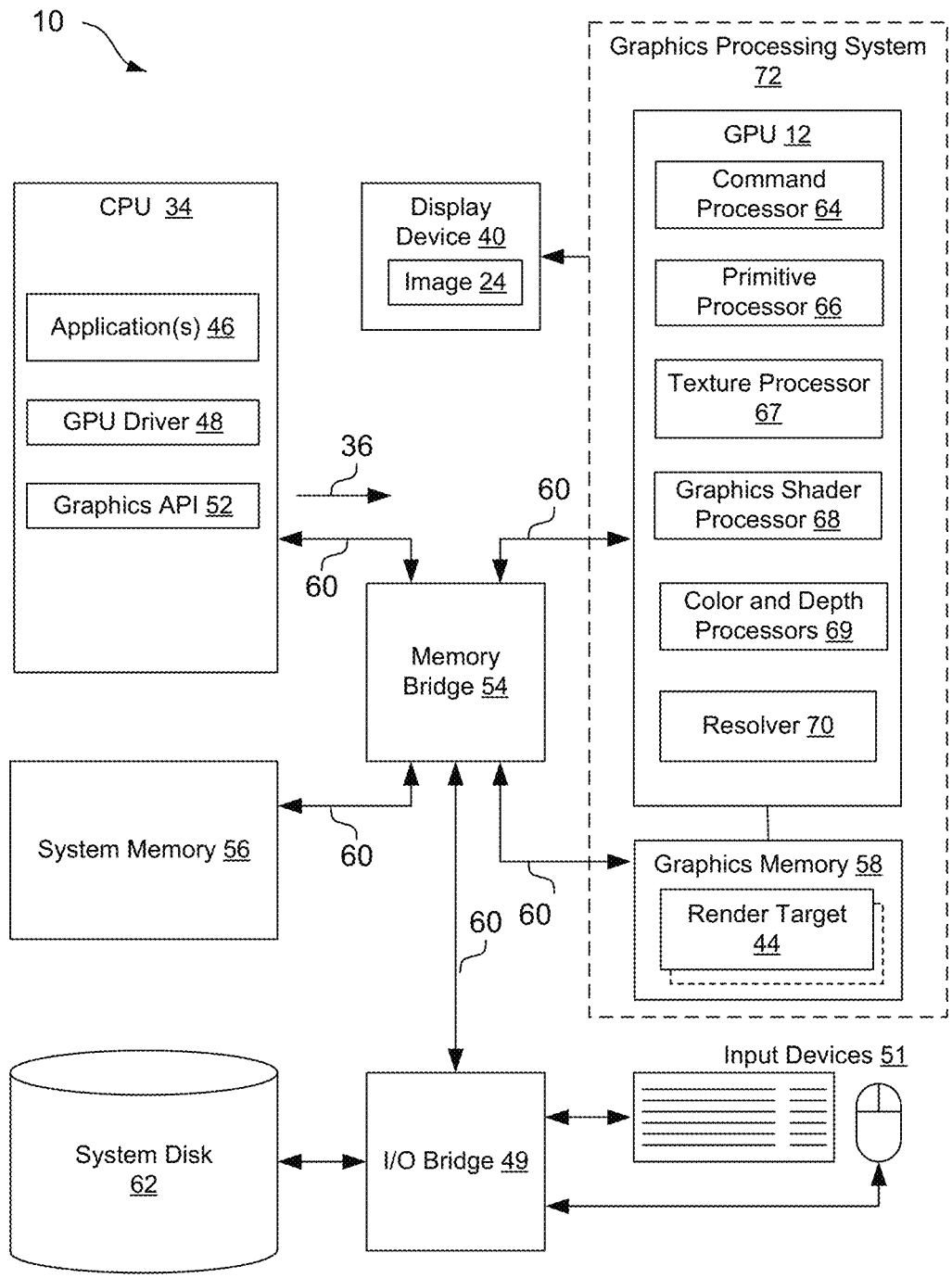
FIG. 1 is a schematic block diagram of an example architecture of a computer device including a graphics processing unit and a graphics pipeline configured according to the described aspects.

The described aspects provide a graphical processing unit (GPU) with a flexible, dynamic, application-directed mechanism for varying the rate at which fragment shading is performed for rendering an image to a display. In particular, the described aspects allow different shading rates to be used for different fragments (e.g., tile, sub-tile, quad, pixel, or sub-pixel region) of a rasterized (scan converted) primitive used to render the image. For instance, the described aspects may allow the shading rate to vary from very coarse (i.e., one shaded sample per 8×8 pixel screen tile) to quad based (i.e., one shaded sample per 2×2 pixel area), or finer (i.e., one shaded sample per pixel), to full subpixel resolution.

In determining the shading rate for different regions of each primitive (and/or different regions of the 2D image), the described aspects take into account variability with respect to desired level of detail (LOD) across regions of the image. For instance, but not limited hereto, different shading rates for different fragments of each primitive may be associated with one or more of foveated rendering (fixed or eye tracked), foveated display optics, objects of interest (e.g., an enemy in a game), and content characteristics (e.g., sharpness of edges, degree of detail, smoothness of lighting, etc.). In other words, the described aspects, define a mechanism to control, on-the-fly (e.g., during the processing of any portion of any primitive used in the entire image in the graphic pipeline), whether work performed by the pixel shader stage of the graphics pipeline of the GPU is performed at a particular spatial rate, based on a number of possible factors, including screen-space position of the primitive, local scene complexity, and/or object identifier (ID), to name a few.

More specifically, the described aspects control respective shading rates for different regions of each primitive (and/or of each 2D image) based on a new, interpolated shading rate parameter for use by a rasterization stage of the graphics pipeline. For instance, the rasterization stage utilizes one or more shading rate parameter values to determine how many samples to shade for each corresponding region of a given primitive. In other words, the described aspects enable the rasterizer to change shading rates on-the-fly (e.g., processing an entire image at one time, for instance, without having to perform different rendering passes or without having to render the same primitive into multiple viewports) as it scan-converts each primitive. Additionally, in combination with determining how many samples to shade, or independently, the rasterization stage utilizes each respective shading rate parameter to determine how many sample positions to consider to be covered by the computed shaded output, e.g., the fragment color. In other words, the described aspects enable the rasterizer to "boost" the coverage of the computed shaded output by allowing the color sample to be shared across two or more pixels. The specific actions related to determination and utilization within the graphics pipeline of this new shading rate parameter are described below in detail.

In some cases, implementation of the described aspects may allow the amount of shading and texturing work within the graphics pipeline to be reduced by as much as a factor of 1024 (e.g., for an 8×8 tile, 64 pixels*16 samples=1024) on a typical GPU.

Optionally, the described aspects may additionally provide an ability to adjust the texture LOD gradient for mipmap LOD determination in a way to correspond to the number of samples shaded in a particular region. Typically texture coordinates are calculated for each pixel in a 2×2 region of pixels in order to derive a gradient, but if only one sample is needed in that 2×2 region, this is wasteful. As such, in one option, the described aspects may run a new shader prologue stage, which may also be referred to as a gradient shader, before performing the rest of fragment shading. In this case, the gradient shader does limited work at pixel granularity just to compute texture gradients.

In some further optional cases, the described aspects may include further optimizations to allow a variety of ways to specify the set of frame buffer pixels and multi-samples that are to be covered by the color value produced.

Additionally, in some examples, it may desirable to perform increased or reduced rate shading over a larger area of an image, such as a screen space (e.g., a statically or dynamically defined region of the image), the entire image, etc. For example, screen space variable rate shading (SSVRS) may be performed in instances such as variable rate shading, motion blurred screens, cut scenes, etc. Accordingly, for example in order to perform SSVRS, a GPU may bind a bitmap (e.g., screen space texture) to a scan converter (i.e., rasterizer stage). The bitmap may be looked up based on one or more bits of screen or viewport x,y coordinates.

Referring to FIG. 1, in one example, a computer device 10 includes a graphics processing unit (GPU) 12 configured to implement the described aspects of variable rate shading. For example, GPU 12 is configured to determine and use different fragment shading rates for shading (i.e. calculating a color for) different fragments covered by a primitive of an image based on respective shading rate parameters for respective regions of the image. In other words, GPU 12 can dynamically vary the rate at which fragment shading is performed on-the-fly during rendering of an image, for example, based on a variability in level of detail (LOD) within the image. Alternatively, or in addition, GPU 12 can be configured to vary a number of samples (e.g., nSamples, such as color samples) for each pixel of the image based on the respective shading rate parameters for respective regions of the image. In other words, GPU 12 can use a coverage mask for each shaded color fragment that enables sharing the shaded color fragment across the samples of two or more pixels.

For example, in one implementation, computer device 10 includes a CPU 34, which may be one or more processors that are specially-configured or programmed to control operation of computer device 10 according to the described aspects. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL™) API, an Open Graphics Library Embedded Systems (OpenGL ES) API, an X3D API, a RenderMan API, a WebGL API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an aspect, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an aspect, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, in an aspect, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an aspect, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse SRP maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some aspects, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

According to one example of the described aspects, graphic API 52 and GPU driver 48 may configure GPU 12 to execute logical graphics pipeline 14 to perform variable rate shading as described herein.

Figure 2:
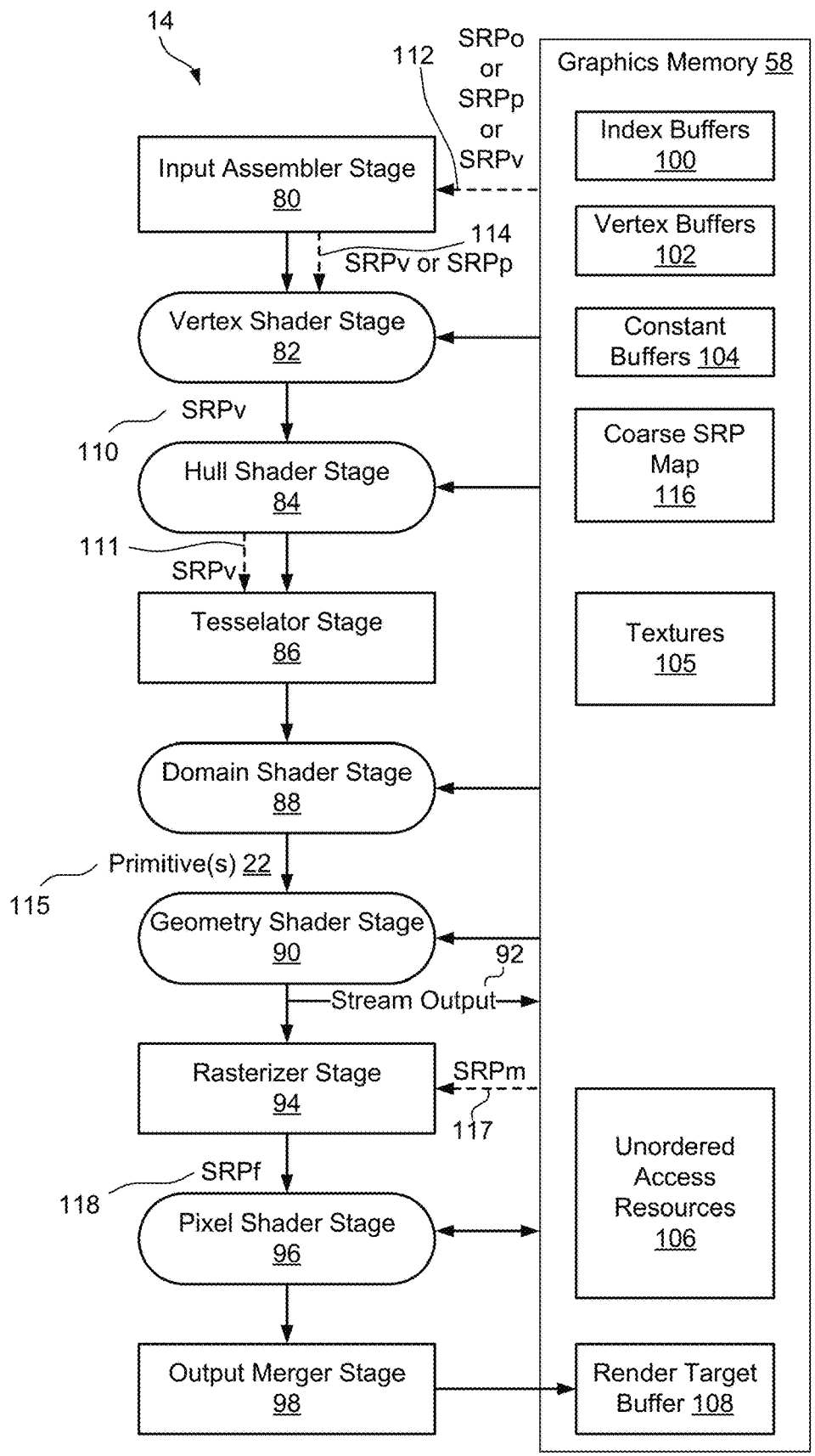
FIG. 2 is a schematic diagram of an example of the graphics pipeline and graphics memory of the computer device of FIG. 1.

Referring to FIG. 2, for instance, in one example, GPU 12 can be configured to implement the stages of an example logical graphics pipeline 14 that may to perform variable rate shading as described herein. In an aspect, one or more of the various stages may be programmable, for instance, to utilize the new, interpolated SRP values described above. Moreover, in an aspect, common shader cores may be represented by the rounded rectangular blocks. This programmability makes graphics pipeline 14 extremely flexible and adaptable. The purpose of each of the stages is now described in brief below, and additional functionality will be further described with respect to subsequent figures.

The input assembler stage 80 supplies data (triangles, lines, points, and indexes) to the pipeline. It also optionally processes shading rate parameters per object (SRPo), per primitive (SRPp), or per vertex (SRPv), generally referenced at 112, as determined by the application 46 (FIG. 1). As generally indicated at 114, input assembler stage 80 may output the SRPp, or an SRPv if the SRPv is not generated by a vertex shader stage 82.

The vertex shader stage 82 processes vertices, typically performing operations such as transformations, skinning, and lighting. Vertex shader stage 82 takes a single input vertex and produces a single output vertex. Also, as indicated at 110, vertex shader stage 82 optionally inputs the per-vertex shading rate parameter (SRPv) or the per-primitive shading rate parameter (SRPp) and typically outputs an SRPv, that is either input or calculated or looked up. It should be noted that, in some implementations, such as when using higher-order surfaces, the SRPv comes from a hull shader stage 84.

The hull shader stage 84, a tessellator stage 86, and a domain-shader 88 stage comprise the tessellation stages— The tessellation stages convert higher-order surfaces to triangles, e.g., primitives, as indicated at 115, for rendering within logical graphics pipeline 14. Optionally, as indicated at 111, hull shader stage 84 can generate the SRPv value for each vertex of each generated primitive (e.g., triangle).

The geometry shader stage 90 optionally (e.g., this stage can be bypassed) processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader can discard the primitive, or emit one or more new primitives. Each primitive emitted will output an SRPv for each vertex.

The stream-output stage 92 streams primitive data from graphics pipeline 14 to graphics memory 58 on its way to the rasterizer. Data can be streamed out and/or passed into a rasterizer stage 94. Data streamed out to graphics memory 58 can be recirculated back into graphics pipeline 14 as input data or read-back from the CPU 34 (FIG. 1). This stage may optionally stream out SRPv values to be used on a subsequent rendering pass.

The rasterizer stage 94 clips primitives, prepares primitives for a pixel shader stage 96, and determines how to invoke pixel shaders. Further, as generally indicated at 118, the rasterizer stage 94 performs coarse scan conversions and determines a per-fragment variable shading rate parameter value (SRPf) (e.g., where the fragment may be a tile, a sub-tile, a quad, a pixel, or a sub-pixel region). Additionally, the rasterizer stage 94 performs fine scan conversions and determines pixel sample positions covered by the fragments.

Further, as indicated at 117, the rasterizer stage 94 can also obtain lookup values (SRPm) from coarse SRP map 116. The lookup values correspond to shading rates specified for a larger area, such as a screen space of the image 24 or the entire image 24. Additionally, the rasterizer stage 94 computes SRPf as a function SRPv and the lookup values (SRPm), as described in further detail below.

The pixel shader stage 96 receives interpolated data for primitives and/or fragments and generates per-pixel data, such as color and sample coverage masks.

The output merger stage 98 combines various types of pipeline output data (pixel shader values, depth and stencil information, and coverage masks) with the contents of the render target 44 (FIG. 1) and depth/stencil buffers to generate the final result of graphics pipeline 14.

Also, as discussed above and as illustrated in FIG. 2, graphics pipeline 14 may operate in conjunction with graphics memory 58 for exchanging and storing data. For example, in an aspect, graphics memory 58 includes one or more vertex buffers 100 that each contains the vertex data used to define geometry of image 24 (or other images). Vertex data includes position coordinates, color data, texture coordinate data, normal data, and so on. The simplest example of vertex buffer 100 is one that only contains position data. More often, vertex buffer 100 contains all the data needed to fully specify 3D vertices. An example of this could be vertex buffer 100 that contains per-vertex position, normal and texture coordinates. This data is usually organized as sets of per-vertex elements.

Further, in an aspect, graphics memory 58 may include one or more index buffers 102, which contain integer offsets into vertex buffers 100 and are used to render primitives 22 more efficiently. Each index buffer 102 contains a sequential set of indices; each index is used to identify a vertex in a vertex buffer.

Also, in an aspect, graphics memory 58 may include one or more constant buffers 104 that allows an efficient supply of shader constants, shader data, and/or any other shader resources to graphics pipeline 14. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, in an aspect, graphics memory 58 may include one or more unordered access resources 106 (which includes buffers, textures, and texture arrays—without multisampling). Unordered access resources 106 allow temporally unordered read/write access from multiple threads. This means that this resource type can be read/written simultaneously by multiple threads without generating memory conflicts through the use of certain defined functions.

Moreover, in an aspect, graphics memory 58 may include one or more render target buffers 108, which contain the rendered target or drawing of each pixel 32 of image 24 produced by graphics pipeline 14.

As described in more detail below with respect to the method of operation of graphics pipeline 14 according to the described aspects, input assembler stage 80 and/or vertex shader stage 82 are configured to determine an SRP value per vertex (SRPv) 110 for each vertex of each primitive 22 of image 24. For example, SRPv value 110 may be determined for each vertex based on one or more SRP values per object (SRPo), SRP values per primitive (SRPp), or SRPp values supplied by application 46 (FIG. 1), e.g., at 112, and/or determined by input assembler stage 80, e.g., at 114, or based on a coarse SRP map 116. Further, rasterizer stage 94 may interpolate and quantize respective SRPv values 110 for different sub-tiles or fragments 18 of each primitive 22 to define SRP values per fragment (SRPf) 118. Pixel shader stage 96 then launches respective threads and performs variable rate shading per fragment of one or more primitives 22 based on each respective SRPf 118, thereby shading variable-area color fragments for use in rendering image 24.

Figures 1, 3:
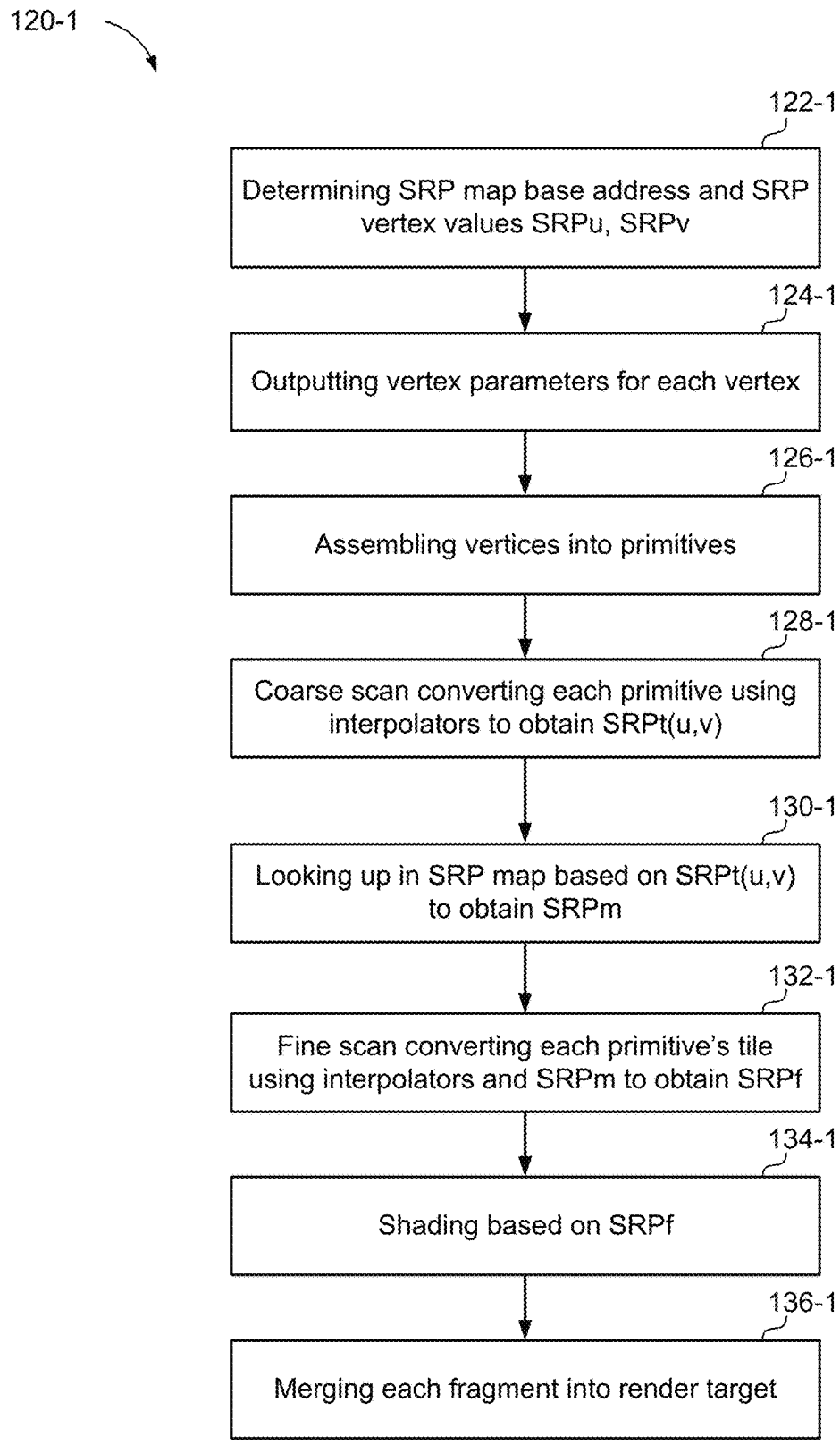
Figures 2, 3:
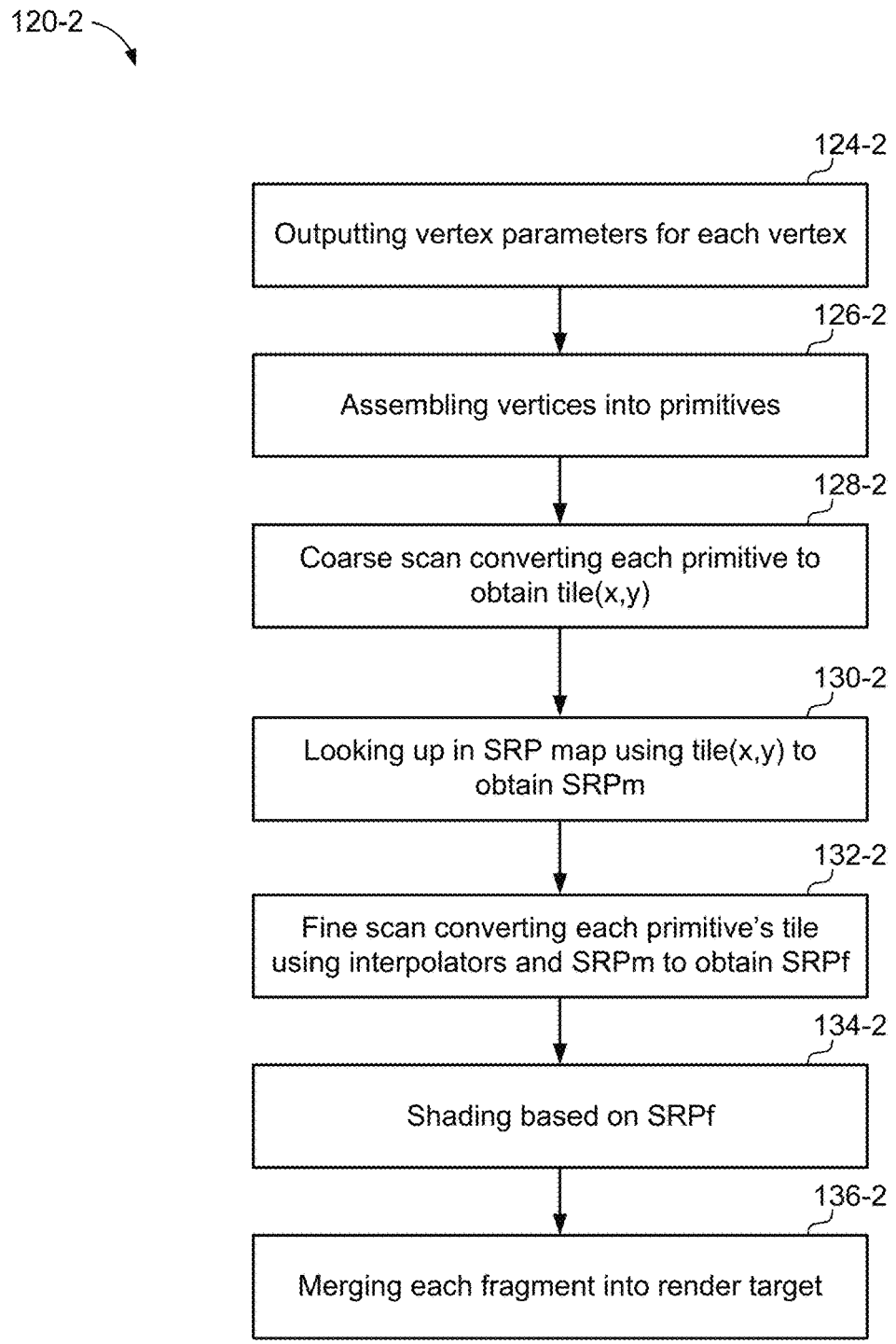
Figure 4:
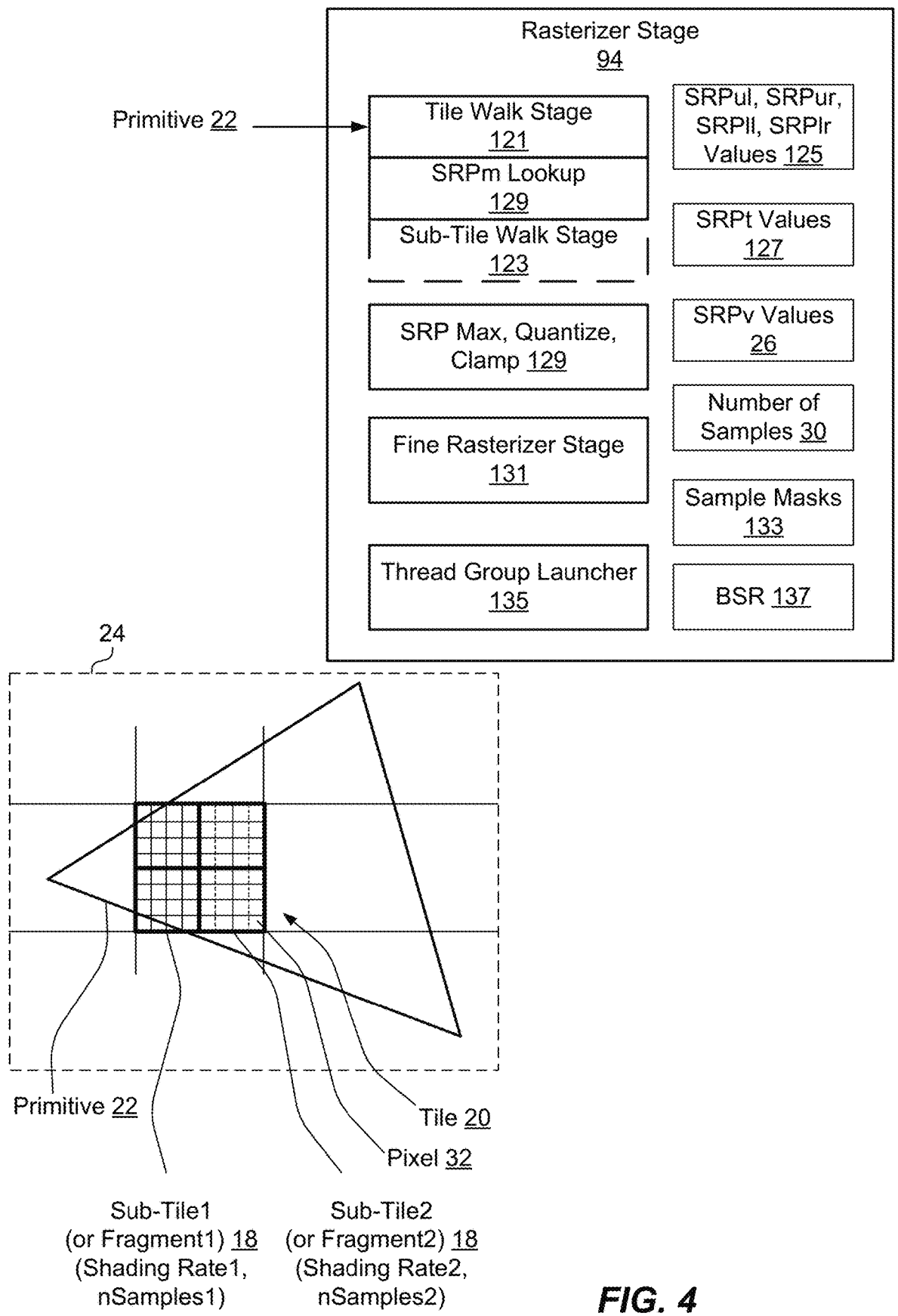
FIG. 4 is a schematic diagram of an example of a primitive of an image, and tiles and sub-tiles covered by the primitive, and an example of a rasterizer stage component and subcomponents associated with the operation of the rasterization stage in the method of FIGS. 3-1 and 3-2.

Referring to FIGS. 3-1 and 4, one example of operating graphics pipeline 14 according to the described aspects may be explained with reference to a method 120-1 of rendering graphics in FIG. 3-1, and with reference to image 24 having one or more primitives 22 covering one or more tiles 20, which may include one or more sub-tiles 18 (e.g., sub-tile1 and sub-tile2) per tile 20 and/or one or more pixels 32, and corresponding components of rasterizer stage 94, as identified in FIG. 4.

Step 1:

At 122-1, method 120-1 includes determining an SRP map base address and SRP vertex values SRPu and SRPv to use based on either an application-based source of initial SRP values, or calculated based on tessellation factors. For example, in an aspect, graphics pipeline 14 and/or input assembler stage 80 or vertex shader stage 82 may be configured to determine an SRPv value 110 to use in subsequent graphics processing based on a source of initial SRP values, based on a function, or based on calculations utilizing tessellation factors from tessellator stage 86.

For example, in a first case, graphics pipeline 14 may receive a per-primitive shading rate parameter SRPp or per-object shading rate parameter SRPo, e.g., at 112, from application 46. In the SRPo case, the input assembler stage 80 inputs SRPo for each object within an image 24 and replicates it as an SRPp value for each primitive 22. Alternatively, input assembler stage 80 inputs a primitive description from graphics command 36, e.g., stored in a command buffer of graphics memory 58, where the primitive description includes an SRPp value. Accordingly, vertex shader stage 82 assigns respective SRPv values 110 for each vertex, e.g., SRPv0=SRPp, SRPv1=SRPp, SRPv2=SRPp.

Alternatively, in a second case, graphics pipeline 14 may produce a calculated SRPv value, e.g., calculated by vertex shader stage 82. In this case, then vertex shader stage 82 inputs constants for an SRP function (e.g., xcenter=an x-axis coordinate value, ycenter=a y-axis coordinate value, radius=a value representing the radius of the region of interest relative to the xcenter and ycenter point, SRPscalefactor=an optional scaling factor that may be used to scale the resulting SRP value, if need be). Additionally, vertex shader stage 82 inputs varyings (e.g., varying input parameters—data unique to each execution thread of a shader—from among Xdc=X-axis coordinate value in display coordinate space, Ydc=Y-axis coordinate value in display coordinate space, and possibly other varying values, e.g., a surface normal), and, for each vertex, calculates SRPv=f(Xdc, Ydc, varyings, constants, SRPscalefactor) where constants are e.g. material color and world transforms, using a function f. Function f can produce, for example, a value that is highest at coordinate (xcenter, ycenter) and falls off to a lowest value outside a specified radius. Specifically for this example:

$$SRPv=SRPscalefactor*min(1,max(0,sqrt((Xdc-xcenter)^2+(Ydc-ycenter)^2))).$$

Alternatively, in a third case, graphics pipeline 14 may produce sampled SRPv values, e.g., from some prior graphics pipeline 14 processing. In this case, vertex shader stage 82, using input constants (base address, hscale=horizontal scale, vscale=vertical scale) performs a lookup in coarse SRP map 116. In particular, for each vertex, vertex shader stage 82, calculates SRPv=lookup(base address, hscale*Xdc, vscale*Ydc)*SRPscalefactor. For instance, this lookup can be after projection, and such may use display coordinates. Otherwise, if not after projection, then the lookup may additionally take into account a z coordinate and/or perspective correction factors. In other words, input assembler stage 80 or vertex shader stage 82 utilizes a 2D map of a viewable area at coarse resolution (e.g., coarse SRP map 116) to look up an SRPv value for each primitive vertex based on a closest point in coarse SRP map 116. The horizontal and vertical coordinate values are scaled to fit the dimensions of the coarse SRP map 116, and, optionally, the resulting SRPv values may be scaled using SRPscalefactor. In an alternative, to add smoothness to the result, the lookup function may include performing an interpolation between the four nearest samples in SRP map 116. The lookup may alternatively be from a 3D map whose $3^{rd}$ dimension is indexed on a Z (depth) value, e.g. to vary SRP based on distance from the viewpoint.

In yet another alternative, e.g., a fourth case, graphics pipeline 14 may determine SRPv values 110 from calculations based on tessellation factors in hull shader stage 84. For example, these tessellation factors can indicate a degree of edge complexity in the scene, and therefore a desired degree of antialiasing. In this case, vertex shader stage 82 uses a maximum of (SV TessFactor=standard value representing edge tessellation, SV_InsideTessFactor=standard value representing interior tessellation) for each patch object input to graphics pipeline 14, and uses it as SRPv for all vertices produced by tessellation within the entire patch.

Thus, the determination of the SRPv value 110 may be distributed within the graphics pipeline 14, e.g., at the input assembler stage 80 and/or the vertex shader stage 82, which may be configured to determine the SRPv value 110 based on either: a) use of the SRPo for every vertex in the object, b) use of the SRPp for every vertex of each primitive, c) use of a pass through that the software application 46 supplies as input per vertex, or d) use of a calculated SRPv based on the map or mathematical function.

Step 2:

At 124-1, method 120-1 includes outputting vertex parameters for each vertex. For example, vertex shader stage 82 outputs parameters such as Xdc (e.g., where "dc" means display coordinates), Ydc, SRPv, and other standard parameters, for each vertex.

Step 3:

At 126-1, method 120-1 including assembling vertices into primitives. For example, in an aspect, graphics pipeline 14 and/or primitive processor 66 instantiating a primitive assembler stage, e.g., prior to geometry shader stage 90, assembles vertices from the vertex parameters, three at a time, into triangles to form a primitive, such as primitive 22.

Step 4:

At 128-1 (and additionally referring to FIG. 4), method 120-1 includes coarse scan converting each primitive using interpolators to obtain SRPt(u, v). For example, in an aspect, graphics pipeline 14 executes rasterizer stage 94 such that, for each primitive 22, coarse scan conversion is performed by a tile-walk stage 121 and/or a sub-tile walk stage 123 based on the SRPv values 26 of the vertices (SRPv0, SRPv1, SRPv2) of the respective primitive 22. The coarse scan convert utilizes interpolators (i, j) (e.g., barycentric coordinates that apply a weighting factor between the vertices that is screen axis aligned), producing SRPul, SRPur, SRPll, SRPlr values 125 (e.g., where "ul" is upper left, "ur" is upper right, "ll" is lower left, and "lr" is lower right) for each tile 20 intersecting primitive 22. Further, for each tile 20 intersecting each primitive 22, rasterizer stage 94 performs the following:

4.1 Determine a maximum SRP value of all tile corner SRP values and any included vertices' SRP values, where the maximum is referred to as an SRPtmax value (e.g., a maximum SRPv value for the tile). For example, in an aspect, rasterizer stage 94 may include a SRPmax, quantize, and clamp component 129 configured to perform this functionality. Optionally tiles can be subdivided into smaller sub-tiles, e.g. 4×4 pixels, and a separate SRPtmax can be calculated for each.

4.2 Quantize and clamp the SRPtmax value to an SRPt value 127, e.g., a sampling rate value within the range of coarse and anti-aliased sampling rates that are supported by the hardware of GPU 12, such as in the range of 1/64 to 16, in factors of two. For example, in an aspect, SRPmax, quantize, and clamp component 129 is configured to perform this functionality. At this point an SRPf value 118 (FIG. 2) is copied from the current tile's SRPt value 127 to be used in subsequent fine scan conversion steps, and optionally transmitted to the pixel shader stage 96.

4.3 GPU 12 may determine that more information may be available to graphics processing system 72 in order to more effectively reduce the amount of pixel shading being performed before pixel shader stage 96. Specifically, in addition to the per-primitive variable rate shading being performed, GPU 12 may perform screen space variable rate shading (SSVRS) to reduce the amount of pixel shading to be performed by pixel shader stage 96.

In an example, when SSVRS is not used, unnecessary pixel shading may be performed during instances of variable rate where optical distortion or foveated rendering causes a variation in shading rate across the field of view. In these instances, screen space rate adjustment may be desired to reduce the per-primitive shading rate. Even though access to screen space distortion data in the primitive or vertex shader stage 82 still occurs, interpolation across primitives (e.g., triangles) may cause problems due to tessellation requiring achievement of correct density of fragments. Also, in an example, SSVRS may be performed instead of lens distortion in per-primitive variable rate shading in order to avoid repeated costs when shading overdrawn primitives.

In another example, SSVRS may be performed for a map that is preloaded with motion information from previous frames to indicate areas where full rate shading might be wasteful due to imminent motion blur. In another example, SSVRS may be performed for playing game cut scenes that use the real time game engine. During these cut scenes, authoring time areas using smaller shading rate may be computed and stored along with the cut scene, as the desired level of detail may not be as high as for other scenes in the game.

In a further example, SSVRS may be performed for larger primitives such as a ground plane that has a low level of detail texture applied to it along with scattered spots of high level of detail, or specular lighting properties requiring high fidelity. In this example, instead of a strictly screen-locked map, the map can be looked up based on texture coordinates interpolated in screen space from the primitive vertices.

As such, in order to perform SSVRS in one example, GPU 12 may bind a bitmap (e.g., screen space texture) (i.e. coarse SRP map 116) to the scan converter (i.e., rasterizer stage 94). The bitmap may be looked up based on one or more bits of screen or viewport x,y coordinates. Each entry in the bitmap can describe either an absolute desired shading rate, or a shading rate change from a specified base shading rate 137 at, for example, 8×8 pixel granularity across the screen, or at a rate corresponding to SRPt in the previous steps.

In an example, for a 4K screen, a two-bit map can utilize 32 kilobytes (KB) of storage with two bits per element, representing four possible absolute shading rates or delta rates from the base shading rate. In another example, for 32×32 pixel granularity, the storage space can be reduced to 1 KB.

Furthermore, there may not be a restriction on the lifetime of a given map (i.e. how many primitives that can use the current map). For example, the map can be the same or different for each render target. Generally, a visibility (depth buffer) is expected to be shaded at the full pixel rate without having to perform a partial flush before changing the visibility, so the map could be a context state. For the map to be a context state, preload queue and the cache may be required. If the coarser granularity map is acceptable then the map could utilize a number of context registers.

Thus, at 130-1 (and additionally referring to FIG. 10), method 120-1 includes looking up SRP map 116 (FIG. 2) to obtain SRPm 117. For example, in an aspect, graphics pipeline 14 executes rasterizer stage 94 to look up the SRP map to obtain SRPm, such that, one or more look up values in a SRP map 116 (SRPm 117) may be identified for one or more fragments (pixels 32) within one or more primitives 22 of one or more objects based at least on coarse texture map coordinates. Then (optionally) the looked up SRPm can be added to the base shading rate 137 stored in a register to produce the final SRP value for the relevant fragments within the designated screen region.

In an example, the map coordinates include coarse screen position coordinates (x, y) (i.e., SRPt(u, v). As noted above in 128-1, SRPt(u, v) is obtained based on coarse scan converting each of the one or more primitives using interpolated SRPm 117. Further, the rasterizer stage 94 includes the SRPm lookup stage 139. In this example, the coarse tile walker of the tile walk stage 121 needs to match the SRPm 117 coarseness.

4.4 At step 132-1, fine scan conversion is performed to determine sample positions covered within the current tile 20 or sub-tile 18 (e.g., pixel centers or multi-sample antialiasing (MSAA) depending on the finest desired sampling rate setting of the render target). Further, in this example, in order to calculate the respective SRPf 118, graphics pipeline 14 can execute rasterizer stage 94 to perform a fine scan conversion to determine the respective SRPf 118 using each of the one or more fragments (pixels 32) of the one or more primitives using interpolators and SRPm 117. For example, in an aspect, rasterizer stage 94 may include a fine rasterizer stage 131 configured to perform this functionality.

Figure 10:
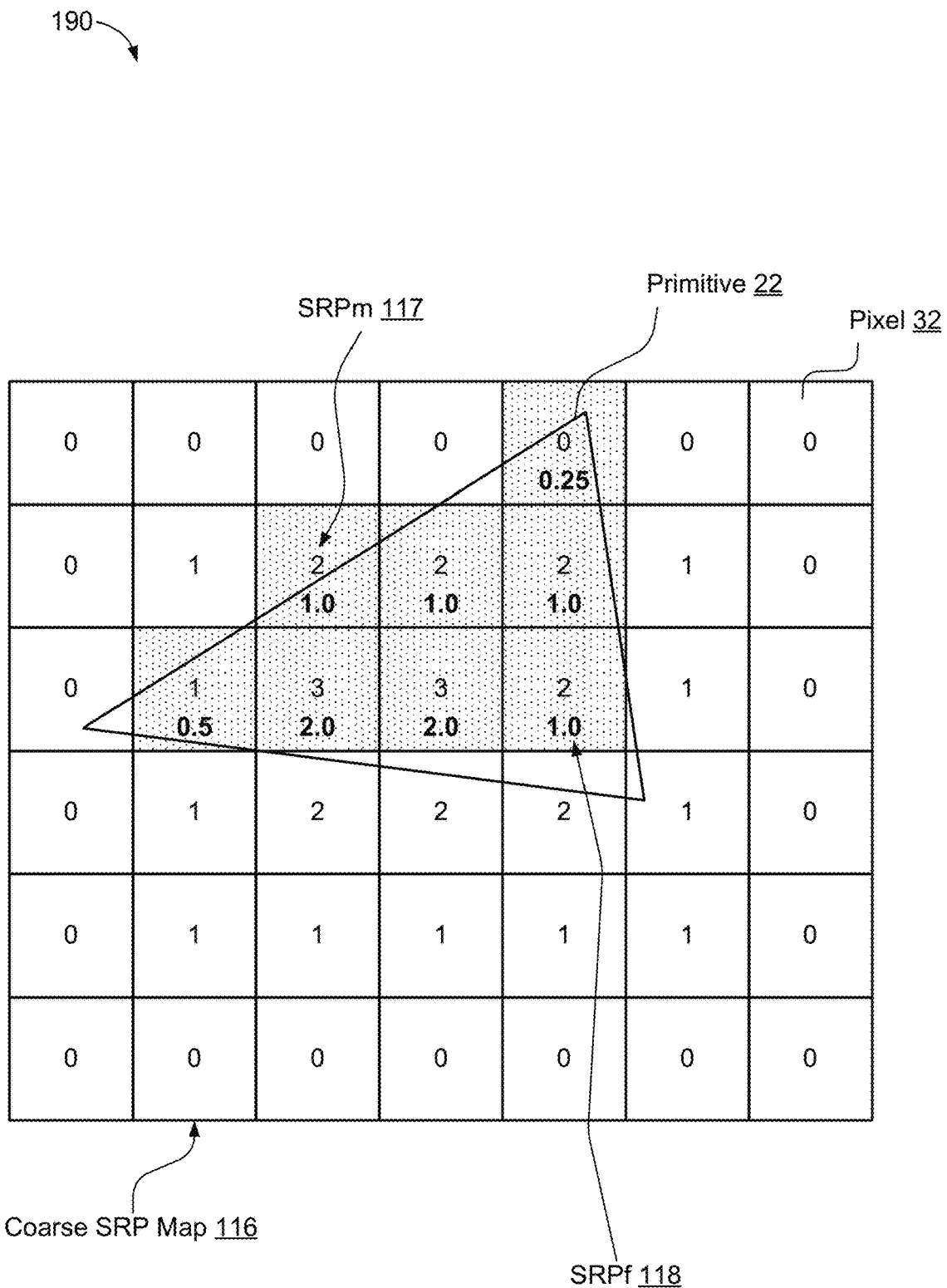
FIG. 10 is an example of calculating fragment variable SRP values for fragments of a coarse SRP map during a rasterization stage in the method of FIGS. 3-1 and 3-2, according to the described aspects.

For example, when performing SSVRS, referring to FIG. 10, an example of calculating fragment variable SRP values for fragments of a coarse SRP map during a rasterization stage 94 is illustrated. In this example, graphics pipeline 14 can execute rasterizer stage 94 to calculate respective fragment variable SRP values (SRPf 118) for each of the one or more fragments (e.g., pixels 32) within the one or more primitives 22 of one or more objects based at least on the one or more lookup values (SRPm 117) and respective base shading rates for the one or more fragments (e.g., pixels 32) within the one or more primitives 22 of one or more objects.

In particular, for each pixel 32, graphics pipeline 14 executes rasterizer stage 94 to calculate respective fragment variable SRP values (SRPf 118) based on the base shading rate 137 and a lookup value (e.g., SRPm 117) corresponding to the pixel 32. In an example, fragment variable SRP values for fragments of a coarse SRP map may be calculated based on the function:

$$SRPf = BSR \times 2^{SRPm[x,y]}$$

where BSR corresponds to the base shading rate 137 for the specific fragment (e.g., pixel 32), and SRPm[x,y] corresponds to the lookup value for the specific fragment (pixel 32). In some examples, the base shading rate 137 may correspond to a previous SRPf that is multiple by $2^{SRPm[x,y]}$.

4.5 Determine the number of fragments to generate within the current tile 20 or sub-tile 18 and the number of samples (nsamples) 30 for each fragment generated within the current tile 20 or sub-tile 18. For example, in an aspect, rasterizer stage 94 or fine rasterizer stage 131 may be configured to perform this functionality.

Also determine the MSAA sample mask dimensions for each fragment generated within the current tile or sub-tile. Mask dimension=f(x=x-axis coordinate, y=y-axis coordinate, SRPt value, tilewidth=a width of the tile, tileheight=a height of the tile, maxAA=a maximum antialiasing value). For example, in an aspect, rasterizer stage 94 or fine rasterizer stage 131 may be configured to perform this functionality.

4.6 For each nsamples 30 by groupsize (e.g., grouping together all threads that have a same number of samples 30, up to a predetermined maximum group size), apply sample coverage to the sample mask 133 and queue (x, y, threadID, attributes, coverage, SRPf) to pixel shader stage 96 in groups. For example, in an aspect, rasterizer stage 94 may include a thread group launcher component 135 configured to perform this functionality.

Example of 4.1 and 4.2

Figures 5, 6:
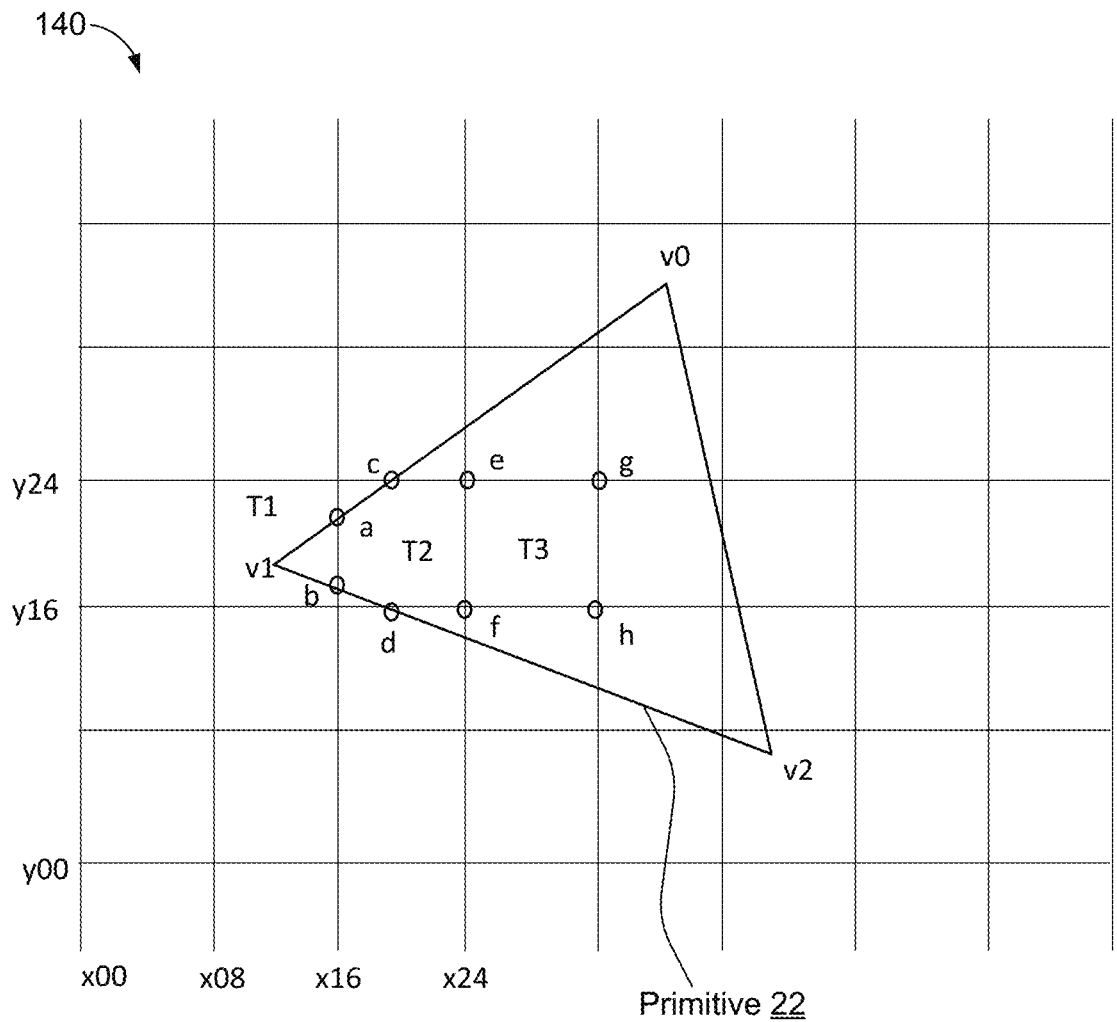
FIG. 5 is a graph of an example primitive having respective vertices each having a respective sample rate parameter (SRP) value, and identifying additional points per tile (e.g., at an intersection with the primitive and/or at corners of the respective tile) from which SRP values may be determined based on interpolation from the corresponding vertex-specific SRP values.
FIG. 6 is a table listing tiles and a formula for choosing a corresponding maximum sample rate parameter (SRP) value for the respective tile from among SRP value corresponding to particular points corresponding to the respective tile, according to the described aspects.

For instance, referring to FIGS. 5 and 6, an example of identifying, by a GPU at the rasterizer stage 94 and in a graph 140, one or more SRPm values 117. In this example, referring specifically to graph 140 of FIG. 5, identifying the SRPm values 117 is based at least on map coordinates (e.g., a, b, c, d, e, f, g, h). Further, an SRPv value is supplied, for example, by application 46 for each vertex (e.g., v0, v1, and v2) of primitive 22. FIG. 5 illustrates interpolation at tile-edge intersections (e.g., in tile 1 (T1) and tile 2 (T2)), tile corners (e.g., in T2 and tile 3 (T3)), and/or vertices (e.g., v0, v1, v2) relevant for each tile, T1, T2, and T3. In this example, each tile comprises an 8×8 sub-tile grid, where each box in the grid represents a pixel.

Referring to the table 150 of FIG. 6, for tile T1 (e.g., which includes a vertex of primitive 22), the SRPtilemax value is the maximum of the SRP values for points v1, a, and b. For tile T2 (e.g., which includes edge intersections with primitive 22), the SRPtilemax value is the maximum of the SRP values for points a, b, c, d, e, and f. For tile T3 (e.g., which is completely covered by primitive 22), the SRPtilemax value is the maximum of the SRP values for points e, f, g, and h.

Example of 4.4 and 4.5

Figure 7:
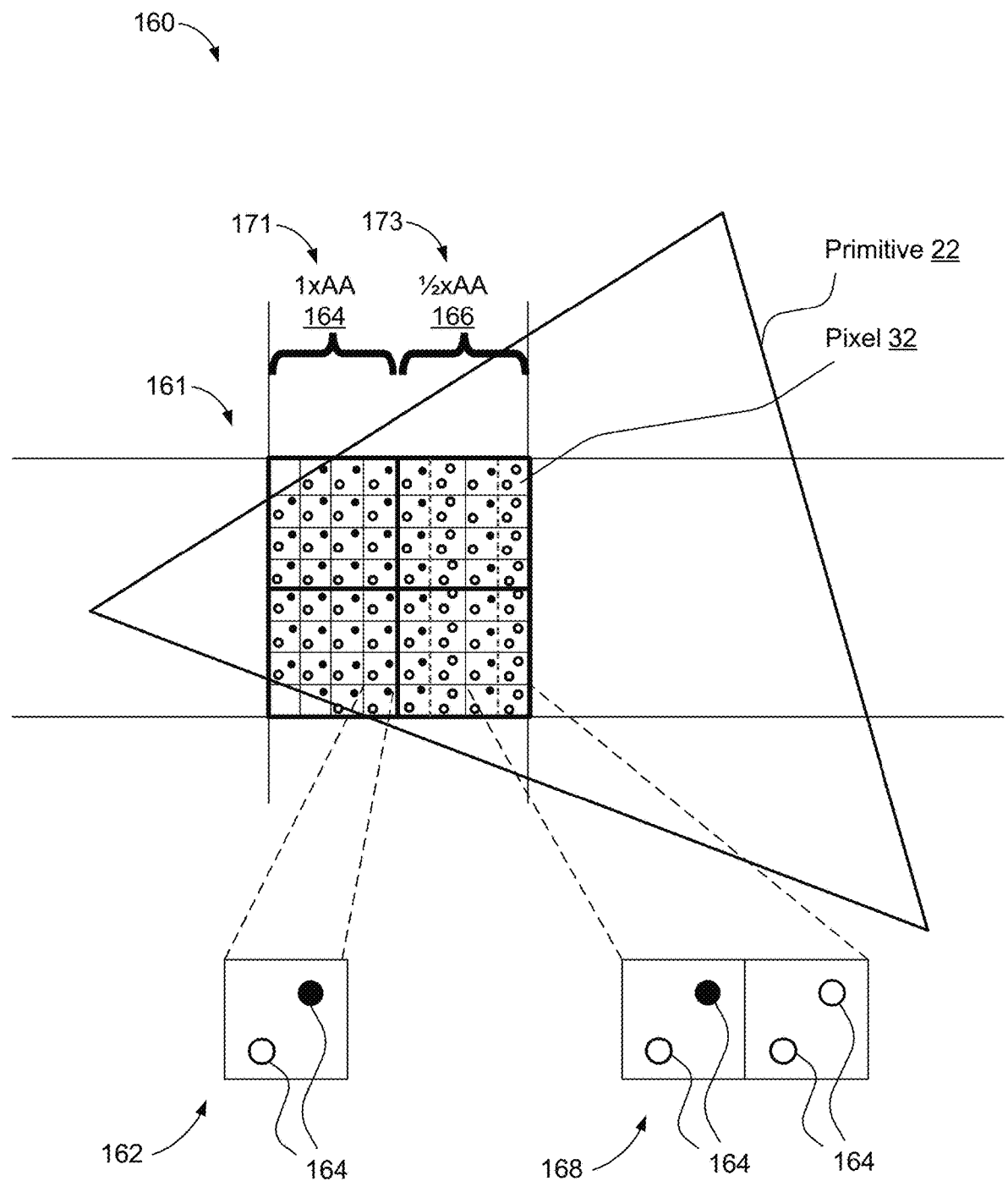
FIG. 7 is a close-up view of the graph of FIG. 6, and additionally including sub-tile grids for one of the tiles of FIG. 6 and sample positions per pixel in each box of the sub-tile grid, and further identifying different shading rates for different sets of pixels in the sub-tile grid, according to the described aspects.

Continuing with the example, referring to graph 160 of FIG. 7, an aspect of fine scanning to determine tiles covered and determining the final nsamples and sample coverage mask is illustrated. In this example, which focuses on Tile T2, the SRP value is evaluated on a 4×4 sub-tile grid. In this instance, a maximum anti-aliasing (AA) for GPU 12 (and thus the configuration of the current render target 44) is set for 2×AA. As such, with this setting, there are a maximum of 2 coverage samples (e.g., represented as a hollow circle and a black circle) evaluated per pixel 32 everywhere over the scan by rasterizer stage 94, and 2 bits are passed per pixel 32 in the coverage mask.

As such, out of the 8×8 sub-tile grid of pixels 161, the leftmost 4×8 pixels 164 of T2 have pixel shading done at 1×AA based on the SRPf 171 for that region of T2. For the tile T2, 59 of the total possible 64 samples are covered; also, 30 of the 32 pixels (e.g., as represented by pixel 162) will be launched for shading (e.g., based on the color samples represented by the black circles) by the target sample position. For each of the 30 launched pixel shader threads, two coverage bits 164 are sent. For instance, in this case, the 8×8 sub-tile grid of pixels 161 may be considered a fragment comprising one color per pixel having a sample coverage mask for all samples belonging to the pixel. Alternatively, for instance, the 8×8 sub-tile grid of pixels 161 may be considered to be one of one or more fragments within a particular region, where each of the fragments comprise one color per one or more of the samples per pixel and having a sample coverage mask for each of the one or more samples per pixel.

In contrast, for the rightmost 4×8 sub-tile grid of pixels 166, shading is done at ½×AA rate (2 wide by 1 high) based on the SRPf 173 for that region, and four coverage bits 164 are sent for each of the 16 threads (corresponding to respective pairs of pixels 168) launched for shading. Thus, the operation of the described aspects on the rightmost 4×8 pixels results in substantial graphics processing savings. For instance, in this case, the rightmost 4×8 sub-tile grid of pixels 166 may be considered one of one or more fragments within a particular region, wherein the one or more fragments comprise one color per multiple pixels and have a sample coverage mask for all of the samples belonging to the multiple pixels.

It should be noted that, in other cases, there may be a particular region having one or more fragments comprising one color per tile and a sample coverage mask for all samples belonging to the pixels belonging to the tile.

Additionally, it should be noted that, corresponding to the above cases, there may be one or more other regions having one or more fragments that have different colors (e.g., from the color of the above regions), e.g., per one pixel or per one or more of the samples per pixel, and having similar coverage masks as mentioned above.

Step 5:

Referring back to FIG. 4, at 134-1, method 120-1 includes shading each pixel based on each SRPf. For example, in an aspect, graphics pipeline 14 executes pixel shader stage 96 for each pixel shader thread to perform one or more of the following actions.

5.1—Determine (x, y, coverage, u, v, other attributes, SRP), where x, y are position coordinates, coverage relates to a coverage mask, the u, v values are texture coordinates, based on a two-dimensional array of texture elements (texels), and where other attributes may be u,v values for a second texture, or surface normal, etc.

5.2—Determine texture sampling gradients du/dx, du/dy, dv/dx, dv/dy utilizing the SRPf.

5.3—Determine texture level of detail (LOD) and degree of anisotropy.

5.4—Perform texture sampling, other shading, and generate color.

5.5—Generate Output Merger color fragment command with (x, y, coverage, color), where coverage is the coverage mask identifying the sample positions covered by the color.

For example, in an aspect, pixel shader stage 96 calculates a color for each queued fragment and outputs the resulting complete fragments to the output merger stage 98 (see method 120-1 at 136-1, explained below). Fragments that cover a single pixel 32 or portion of a single pixel 32 are sent in a single command to the output merger stage 98. In an embodiment, fragments that cover multiple pixels 32 are replicated and sent a pixel at a time to the one or more output merger units that handle particular (x,y) pixels. In another embodiment, fragments that cover multiple pixels 32 are sent as a single command to the output merger stage 98, where they are stored in a fragment buffer that permits large fragments to be later resolved into individual pixel values. In other words, "fragment" to refer to the color plus coverage mask produced by the pixel shader stage 96 for a particular "region" of a primitive 22. So a region could have a particular shading rate resulting in some number of fragments being shaded.

Example of 5.1 and 5.2

Figure 8:
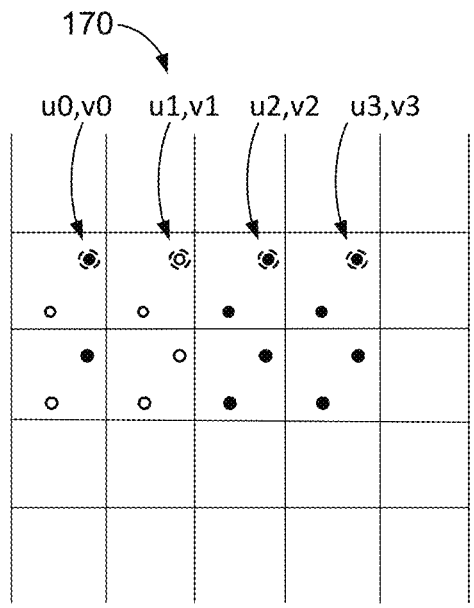
FIG. 8 is a graph of an example of calculating texture gradients for each pixel of a sub-tile grid, according to the described aspects.
Figure 9:
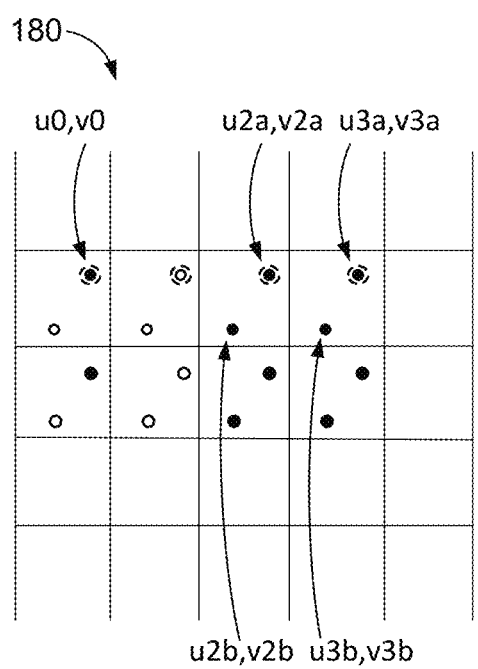
FIG. 9 is a graph of an example of modifying the calculated texture gradients of the graph of FIG. 8 by the tile-specific or fragment-specific SRP value determined according to the described aspects.

In one example of initiating the threads and determining texture sampling, referring to graphs 170 and 180 of FIGS. 8 and 9, respectively, rasterizer stage 94 can calculate gradients 172 du/dx, dv/dx, du/dy, dv/dy for dx=1 and dy=1, at each sample corresponding to a pixel (e.g., pixels 0, 1, 2, and 3 in a row of the graph), independent of SRP, using neighboring u and v (sample locations identified by a dashed line circle) also calculated by rasterizer stage 94 (see, e.g., FIG. 8). In this case, "du/dx" represents a change in u (delta u) over a local distance in x (delta x)—in other words, a fraction du/dx. A similar concept applies to du/dy, dv/dx, and dv/dy. For example, the X-axis gradient at pixel 0 is du/dx0, which is calculated as u1 minus u0. Also, FIG. 8 lists the respective SRP values at each vertex (e.g., SRP0=0.5, etc.). Then, pixel shader stage 96, or pre-pass stage, can modify these gradients to define modified gradients 182 for the shaded samples using the respective SRPf from rasterizer stage 94 (see, e.g., FIG. 9). For example, for sample 0, the gradient determined in FIG. 8 is multiplied by the respective SRP for sample 0 to generate the modified gradient 182 (e.g., du/dx0'=du/dx0*SRP0). A similar modification is made for the gradients at the other samples, including two gradients at some vertices that have color at two sub-pixel sample positions (e.g., du/dx2a' and du/dx2b', and du/dx3a' and du/dx3b').

Examples of the thread groupings issued by the thread group launcher component 135 and processed by pixel shader stage 96 for different shading rates are noted below in Table 1.

TABLE 1

Thread groupings

| Shading Rate | # Threads/group | Notes |
| --- | --- | --- |
| Entire 8 × 8 tile at quad rate (¼ × AA) | 16 | On some architectures this is only a partial group of threads, so the maximum benefit is reduced unless can combine with neighboring tile |
| Entire tile at pair rate (1:2 or 2:1) | 32 | Fully utilized wave |
| Entire tile at 1 × AA rate | 64 | |

It should be noted that if the sample rate parameter tends to vary in a predictable, screen-oriented way, multiple render targets (MRTs) with different maximum AA configurations can be used to optimize space.

Step 6:

As such, at 136-1, method 120-1 includes merging each fragment into a render target. For instance, output merger stage 98 may write each fragment color to the current render target 44 (FIG. 1) based on the shading result. For example, output merger stage 98 may process each color fragment. In particular, for each pixel and/or sample covered, output merger stage 98 can perform a depth-aware blend or write function at an AA level of the destination render target buffer 108.

As another option, especially for fragments that cover multiple pixels, the pixel shader stage 96 can output color gradients dc/dx and dc/dy along with a reference color c (where c can be one of red, green, or blue), so that the output merger stage 98 can either calculate itself and store a unique color per pixel, or store the fragment along with the gradients and defer turning it into individual pixel color values until a subsequent resolve process.

In another example, referring to FIGS. 3-2 and 4, another example of operating graphics pipeline 14 according to the described aspects may be explained with reference to a method 120-2 of rendering graphics in FIG. 3-2, and with reference to image 24 having one or more primitives 22 covering one or more tiles 20, which may include one or more sub-tiles 18 (e.g., sub-tile1 and sub-tile2) per tile 20 and/or one or more pixels 32, and corresponding components of rasterizer stage 94, as identified in FIG. 4. In particular, FIG. 3-2 corresponds to an example of when map coordinates include texture coordinates (u, v).

In an example, method 120-2 includes at 124-2, outputting vertex parameters for each vertex, similar to 124-1 of method 120-1 (FIG. 3-1). Further, method 120-2 includes at 126-2, assembling vertices into primitives 22, similar to 126-2 of method 120-2 (FIG. 3-1).

At 128-2, method 120-2 includes coarse scan converting each primitive to obtain tile (x, y) (i.e., texture coordinates). In this example, rasterizer stage 94 may determine texture coordinates based on coarse scan converting each of the one or more primitives 22 using interpolated per-primitive parameters.

At 130-2 (and additionally referring to FIG. 10), method 120-2 includes looking up SRP map 116 (FIG. 2) to obtain SRPm 117. For example, in an aspect, graphics pipeline 14 executes rasterizer stage 94 to look up the SRP map 116 to obtain SRPm 117, such that, one or more look up values (SRPm 117) in a SRP map 116 may be identified for one or more fragments (pixels 32) within one or more primitives 22 of one or more objects based at least on map coordinates. Then (optionally) the looked up SRPm 117 can be added to the base shading rate 137 stored in a register to produce the final SRP value for the relevant fragments within the designated screen region.

In an example, the map coordinates include texture coordinates (u, v). As noted above in 128-2, the texture coordinates are obtained based on coarse scan converting each of the one or more primitives using interpolated per-primitive parameters. Further, the rasterizer stage 94 includes the SRPm lookup stage 139. In this example, the coarse tile walker of the tile walk stage 121 needs to match the SRPm 117 coarseness.

In an example, method 120-2 includes at 132-2, fine scan converting each primitive's tile using interpolators and SRPm 117 to obtain SRPf 118, similar to 132-1 of method 120-1 (FIG. 3-1). Further, method 120-2 includes at 134-2, shading based on SRPf 118, similar to 134-1 of method 134-1 (FIG. 3-1). Additionally, method 120-2 includes at 136-2, merging each fragment into render targets, similar to 136-1 of method 120-1 (FIG. 3-1).

Figure 11:
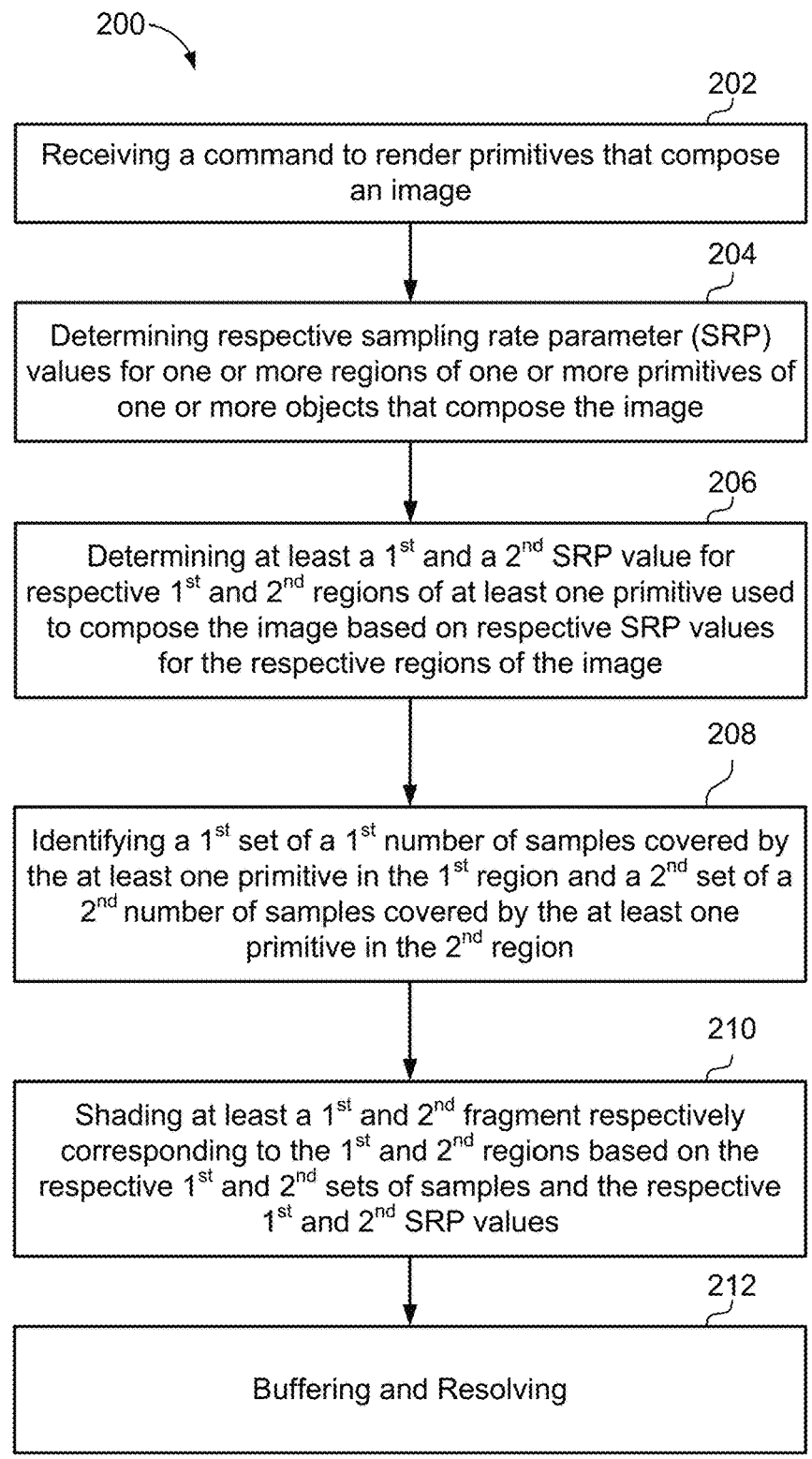
FIG. 11 is a flowchart of a method of rendering an image on a computer device, which encompasses the method in the flowchart of FIG. 2.

Referring to FIG. 11, the operation of computer device 10 having graphics pipeline 14 according to the described aspects is explained with reference to a method 200 of rendering graphics on computer device 10.

At 202, method 200 includes receiving a command to render primitives that compose an image. For example, in an aspect, GPU 12 may receive graphics command 36 from application 46 executed by CPU 34 to render primitives 22 that compose image 24 on a screen of display device 40. For example, the image 24 may comprise one or more objects, and each object may comprise one or more primitives 22. The graphics command 36 may be received, for instance, by command processor 64 via GPU driver 48 and graphics API 52, as described above. In other words, receiving the command to render primitives that compose the image may include receiving an SRP value per object (SRPo) for one or more objects in the image or receiving an SRP value per vertex (SRPv) for one or more vertices in the image, and wherein determining the respective SRP values for the one or more regions further comprises using selected SRPo values or selected SRPv values corresponding to each region.

At 204, method 200 further includes determining respective sampling rate parameter (SRP) values for one or more regions of one or more primitives of one or more objects that compose the image. For example, in an aspect, GPU 12 may execute graphics pipeline 14 to operate input assembler state 80, vertex shader stage 92, or some combination thereof, to determine respective sampling rate parameter (SRP) values, e.g., SRPv values 110, for vertices of each primitive 22 corresponding to respective regions of image 24. In one implementation, input assembler state 80, vertex shader stage 92, or some combination thereof, may execute method 120-1 (FIG. 3-1) at 122-1 and/or 124-1 to determine SRPv values 110 based on source of initial SRP values, or calculate SRPv values 110 based on tessellation factors and/or based on performing a lookup in coarse SRP map 116, and output the resulting SRPv values 110 for each vertex of each primitive 22 of image 24, as described above. In other words, determining the respective SRP values for the one or more regions may include using selected SRPo values or selected SRPv values corresponding to each region, or to determining the respective SRP values for the one or more regions based on a coarse texture map.

At 206, method 200 also includes determining at least a first SRP value for a first region of at least one primitive used to compose the image and a second SRP value for a second region of the at least one primitive used to compose the image based on the respective SRP values for the respective regions of the image. Also, at 206, the first SRP value and a second SRP value correspond to different sample rates and are based on the respective SRP values for respective regions of image 24. For example, in an aspect, GPU 12 may execute rasterizer stage 94 of graphics pipeline 14 to utilize at least a first SRP value, e.g., a first SRPf value 118, for at least a first region, e.g., a first sub-tile, and a second SRP value, e.g., a second SRPf value 118, for at least a second region, e.g., a second sub-tile, for at least one tile 20 covered by the at least one primitive 22. For instance, in one implementation, rasterizer stage 94 may use method 120 at 128 to determine tile-specific and fragment-specific SRP values that are interpolated from SRPv values 110 of each respective primitive 22. For instance with respect to one implementation, refer to the description above of the coarse scanning, interpolation, SRPtmax determination, quantizing and clamping, fine scan conversion and sample coverage determination discussed above with respect to method 120 at 128 and FIGS. 4-7.

At 208, method 200 includes identifying a first set of a first number of samples covered by the at least one primitive in the first region and a second set of a second number of samples covered by the at least one primitive in the second region. For example, in an aspect, GPU 12 may execute rasterizer stage 94 of graphics pipeline 14 to generate a first set of a first number of samples (e.g., a first set of nsamples 30) covered in the first region having the first SRP value (e.g., a first SRPf 118, such as SRPf 171 in FIG. 7) and a second set of a second number of samples (e.g., a second set of nsamples 30) covered in the second region having the second SRP value (e.g., a second SRPf 118, such as SRPf 173 in FIG. 7) for one or more respective pixels 32 covered by the at least one primitive 22. It should be noted that the first number of samples and the second number of samples, which define a sample mask, can include as few as 1 sample per pixel and as many as 16 samples per pixel. For instance with respect to one implementation, refer to the description of the coarse scanning, interpolation, SRPtmax determination, quantizing and clamping, fine scan conversion and sample coverage determination discussed above with respect to method 120 at 128 and FIGS. 4-7.

At 210, method 200 includes shading at least a first fragment corresponding to the first region based on the first set of the first number of samples and the first SRP value, and at least a second fragment corresponding to the second region based on the second set of the second number of samples and the second SRP value. For example, in an aspect, GPU 12 may execute pixel shader stage 96 of graphic pipeline 14 is operable to shade at least a first fragment (e.g., corresponding to a first sub-tile grid 18) corresponding to the first region based on the first set of the first number of samples (e.g., the first set of nsamples 30) and a first SRPf 118 (e.g., SRPf 171 in FIG. 7), and a second fragment (e.g., corresponding to a second sub-tile grid 18) corresponding to the second region based on the second set of the second number of samples (e.g., the second set of nsamples 30) and a second SRPf 118 (e.g., SRPf 173 in FIG. 7). For instance with respect to one implementation, refer to the description above of shading based on SRPf values 118 with respect to method 120 at 134 and FIGS. 5-8. Further, for example, the shading at 210 can include performing shading and texturing of the samples covered based on the maximum SRP value per tile; and generating a color fragment command based on the shading and the texturing of the samples covered.

In other words, based on this disclosure, different regions of a primitive or an object or an image may be determined to have different SRP values, and hence are shaded at different shading rates. In particular, the shading in a first region can be based on one of: (i) one color per sample; (ii) one color per pixel; or, (iii) one color per multiple pixels (e.g., including a whole tile), while the shading in a second region can be based on a different one of (i), (ii), or (iii). As such, different regions can have different shading rates.

For instance, in one example, the shading of a first set of one or more fragments (e.g., including the first fragment) within the first region may be based on a first color per sample and a first sample coverage mask for all of the samples in the first region. And, the shading of a second set of one or more fragments (e.g., including the second fragment) within the second region is based on a second color per pixel and a second sample coverage mask for all of the samples belonging to each pixel in the second region.

Also, in another example, the shading of a first set of one or more fragments (e.g., including the first fragment) within the first region may be based on a first color per pixel and a first sample coverage mask for all of the samples belonging to each pixel in the first region. And, the shading of a second set of one or more fragments (e.g., including the second fragment) within the second region is based on a second color per multiple pixels and a second sample coverage mask for all of the samples belonging to the multiple pixels in the second region.

Additionally, in yet a further example, the shading of a first set of one or more fragments (e.g., including the first fragment) within the first region may be based on a first color per multiple pixels and a first sample coverage mask for all of the samples belonging to the multiple pixels in the first region. And, the shading of a second set of one or more fragments (e.g., including the second fragment) within the second region is based on a second color per sample and a second sample coverage mask for all of the samples in the second region.

Additionally, in an aspect, the shading includes outputting color gradients and a reference color, and calculating and storing a unique color per pixel based on the color gradients and the reference color (see, e.g., the above discussion relating to FIGS. 8 and 9). Alternatively, the shading may include deferring the calculating and the storing of the unique color per pixel by storing at least one of the first fragment or the second fragment along with the color gradients and the color reference.

Further, in an aspect, shading the first fragment further comprises shading at a first shading rate relative to a maximum antialiasing rate based on the first SRP value (e.g., SRPf 171 in FIG. 7), and shading the second fragment further comprises shading at a second shading rate relative to the maximum antialiasing rate based on the second SRP value (e.g., SRPf 173 in FIG. 7), wherein the second shading rate is different from the first shading rate.

At 212, method 200 includes buffering the generated results, and, ultimately, resolving the pixel colors for the image based on the generated results. For example, in an aspect, GPU 12 can execute output merger stage 98 of graphics pipeline 14 to send render targets 44 to render target buffer 108. Then, GPU 12 can execute resolver component 70 of graphics pipeline 14 to utilize the render targets 44 for generating image 24 on a screen of display device 40.

Figure 12:
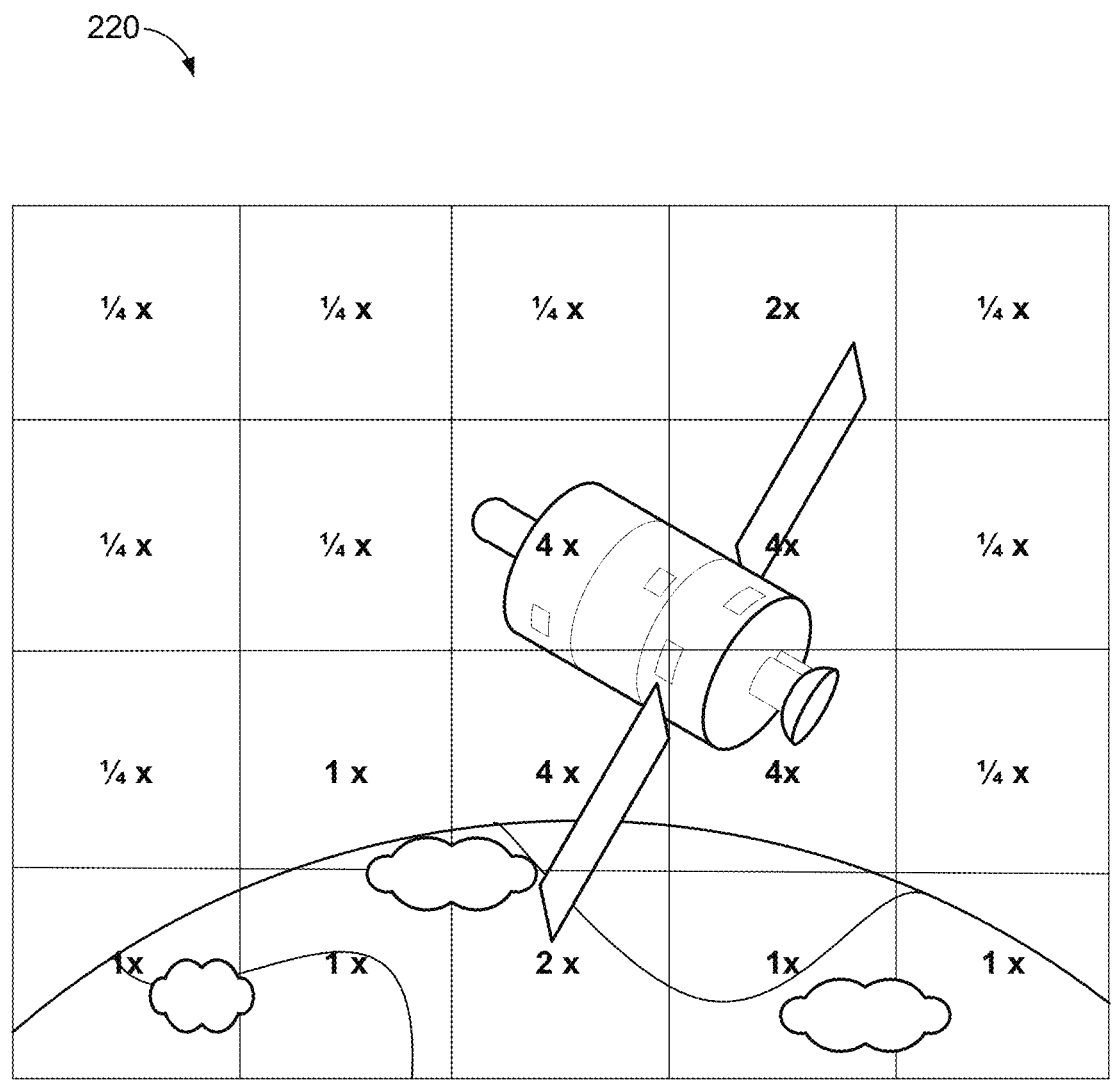
FIG. 12 is an example of an image generated by the computer device of FIGS. 1 and 2, and overlaying the image a representation of a grid of tiles, wherein different ones of the tiles have different shading rates as determined according to the described aspects.

Referring to FIG. 12, for instance, an example image 220 generated by graphics pipeline 14 according to method 200 and/or method 120 of the disclosure includes different tiles having different shading rates (such as, but not limited to, ¼xAA, 1xAA, 2xAA, 4xAA) depending on a level of detail of different portions or regions of image 220.

Thus, in summary, the described aspects enable graphics pipeline 14 of GPU 12 to use a scan rate parameter to vary the shading rate, from 1 sample/quad up to full AA. For example, in an aspect, the graphics pipeline 14 is operable for receiving a command to render one or more primitives of one or more objects that compose an image, and for determining respective sampling rate parameter (SRP) values for one or more regions of one or more primitives or one or more objects composing the image. Further, the graphics pipeline 14 is operable for determining respective vertex-specific SRP values based on the respective source of the SRP values, and coarse scanning and converting primitives to tiles based on the vertex-specific SRP values. Also, the graphics pipeline 14 is operable for determining a maximum SRP value per tile based on the coarse scanning and converting. Then, the graphics pipeline 14 is operable for fine scanning to determine position samples covered based on the maximum SRP value per tile. Additionally, the graphics pipeline 14 is operable for shading and texturing of the samples covered based on the maximum SRP value per tile. Then, the graphics pipeline 14 is operable for generating a color fragment command based on the shading and texturing of the samples covered, and performing a depth-aware blend or write function at an anti-aliasing level of a destination render target buffer according to the corresponding color fragment command.

Further, for example, the described aspects can enable allocating a render target at the maximum AA rate required. In some optional aspects, graphics pipeline 14 may additionally use a primitive stage multiple-viewport technique with multiple render targets 44 to optimize the amount of space used to store the different portions of the screen of the display device 40 at different AA rates. This includes specialized resolve or display stage logic to produce a consistent, one-pixel-per-color frame for display.

Also, in the described aspects, the SRP parameter can be produced by a number of methods upstream of scan converter. For example, such methods include: coarse screen-aligned map (static or dynamic); vertex shader feeds pixel shader with results from a map generated by a previous stage or rendering pass; object based (i.e., of an object or feature in an image; based on importance, complexity of features, and/or known modeled "edginess"); computed, e.g. radius from x0,y0; use early depth pass, use depth complexity per tile; bumpiness during vertex shading; etc.

Additionally, the described aspects involve interpolating an SRP vertex-specific value across each primitive as part of coarse (e.g., 8×8 sub-tile) scan conversion. Alternatively, the described aspects may only consider vertical values if a primitive is fully contained in a tile. Further, after interpolating, the described aspects include truncating the SRP value to factors of two and clamping the SRP value based on hardware capabilities, e.g. ¹⁄₆₄xAA, ¼xAA, ½x, 1x, 2x, 4x, 8xAA, 16xAA. Optionally, the described aspects may include separate SRP values for x, y dimensions, which allows for anisotropic shading.

Further, in determining the sample rate, the described aspects consider the minimum and maximum SRP values per tile covered. In a simple determination, the described aspects can use the same rate for an entire 8×8 sub-tile grid based on the identified SRPtmax. In another case, if the SRP value is constant (e.g., minimum value=maximum value), then the described aspects can launch thread groups in powers of 2, which can improve shader stage efficiency. In some cases, the described aspects may utilize different shading rates per respective sub-tile regions, e.g., a 4×4 pixel region. Also, in some cases, the described aspects may issue threads to the shader stage at a maximum required rate over an entire tile, e.g., an 8×8 sub-tile grid, and then have the shader stage early-out (e.g., discard) unused samples.

Moreover, in some implementations, the described aspects may issue fragments at coarse shading rate that includes a boosted sample coverage mask (i.e. broadcast). In other words, the color associated with the fragment may be shared by two or more pixels, thereby providing processing efficiencies.

It should be noted that the described aspects of graphics pipeline 14 may be implemented without affecting other graphics processes. For instance, hierarchical Z, early Z, and Stencil processes should continue to work orthogonally. Also, depth and coverage (occlusion) passes operate at maximum allocated AA mode, unless there is a performance advantage to making this coarse as well. Further, the frame buffer resolve works exactly the same as before, including any fragment-aware optimizations.

Optionally, the described aspects may include a new way to efficiently inform the Output Merger stage that "this color fragment is for an entire quad (e.g., 4×4 sub-tile of a tile)."

Also, in some optional implementations, the described aspects may include mechanisms for how to handle texture LOD intrinsically with the described variable shading rate. For example, in some case, the described aspects may update the fixed-function hardware to take into account the variable shading rate. In other cases, the described aspects may include running a "pre-pixel" shader to calculate this. Alternatively, some implementations may simply make the shader stage always calculate it, or informing the shader stage of the parameter.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a computer device (such as, but not limited to, a game console). In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method of rendering graphics in a computer device, comprising:
   receiving, by a graphics processing unit (GPU), at least one of a per-primitive shading rate parameter (SRP) or a SRP map from an application via an application programming interface (API);
   determining, by the GPU, a fragment SRP value for a fragment within a primitive of an object based on one or both of the per-primitive shading rate parameter or the SRP map;
   determining a number of samples for the fragment based on the fragment SRP value and a multi-sample antialiasing rate; and
   shading, by the GPU, the fragment within the primitive of the object based on the fragment SRP value.

2. The method of claim 1, further comprising:
    determining one or more per vertex SRP values for one or more vertices within the fragment based on the per-primitive SRP; and
    determining a look up value for the fragment based on the SRP map.

3. The method of claim 2, wherein determining the fragment SRP value comprises selecting a maximum shading rate for the fragment from the one or more per vertex SRP values or the look up value.

4. The method of claim 2, wherein determining the fragment SRP value comprises computing the fragment SRP value as a function of the one or more per vertex SRP values and the look up value for the fragment.

5. The method of claim 1, wherein the shading comprises sending a coverage mask including a number of coverage bits corresponding to the number of samples to a shader thread.

6. The method of claim 1, wherein the SRP map is bitmap indicating an absolute shading rate or shading rate change for one or more bits of screen or viewport coordinates.

7. The method of claim 1, wherein determining the fragment SRP value based on the SRP map comprises:
    determining, by the GPU, map coordinates for the primitive of the object, the map coordinates indicating a location on the SRP map of the fragment within the primitive of the object;
    identifying, by the GPU, a lookup value for the fragment within the primitive of the object based at least on the map coordinates; and
    calculating, by the GPU, the fragment SRP value for the fragment within the primitive of the object based at least on the lookup value.

8. A computer device, comprising:
    a memory; and
    a graphics processing unit (GPU) in communication with the memory, wherein the GPU is configured to:
        receive at least one of a per-primitive shading rate parameter (SRP) or a SRP map from an application via an application programming interface (API);
        determine a fragment SRP value for a fragment within a primitive of an object based on one or both of the per-primitive shading rate parameter or the SRP map;
        determine a number of samples for the fragment based on the fragment SRP value and a multi-sample antialiasing rate; and
        shade the fragment within the primitive of the object based on the fragment SRP value.

9. The computer device of claim 8, wherein the GPU is further configured to:
    determine one or more per vertex SRP values for one or more vertices within the fragment based on the per-primitive SRP; and
    determine a look up value for the fragment based on the SRP map.

10. The computer device of claim 9, wherein the GPU is configured to select a maximum shading rate for the fragment from the one or more per vertex SRP values or the look up value.

11. The computer device of claim 9, wherein the GPU is configured to compute the fragment SRP value as a function of the one or more per vertex SRP values and the look up value for the fragment.

12. The computer device of claim 8, wherein the GPU is configured to send a coverage mask including a number of coverage bits corresponding to the number of samples to a shader thread.

13. The computer device of claim 8, wherein the SRP map is bitmap indicating an absolute shading rate or shading rate change for one or more bits of screen or viewport coordinates.

14. The computer device of claim 8, wherein the GPU is configured to:
    determine map coordinates for the fragment within the primitive of the object, the map coordinates indicating a location on the SRP map of the fragment within the primitive of the object;
    identify a lookup value for the fragment within the primitive of the object based at least on the map coordinates; and
    calculate the fragment SRP value for the fragment within the primitive of the object based at least on the lookup value.

15. A non-transitory computer-readable medium storing computer-executable instructions executable by a processor for rendering graphics in a computer device, comprising:
    instructions for receiving, by a graphics processing unit (GPU), at least one of a per-primitive shading rate parameter (SRP) or a SRP map from an application via an application programming interface (API);
    instructions for determining, by the GPU, a fragment SRP value for a fragment within a primitive of an object based on one or both of the per-primitive shading rate parameter or the SRP map;
    instructions for determining a number of samples for the fragment based on the fragment SRP value and a multi-sample antialiasing rate; and
    instructions for shading, by the GPU, the fragment within the primitive of the object based on the fragment SRP value.

16. The non-transitory computer-readable medium of claim 15, further comprising:
    instructions for determining one or more per vertex SRP values for one or more vertices within the fragment based on the per-primitive SRP;
    instructions for determining a look up value for the fragment based on the SRP map; and instructions for computing the fragment SRP value as a function of the one or more per vertex SRP values and the look up value for the fragment.

17. The non-transitory computer-readable medium of claim 15, further comprising instructions for sending a coverage mask including a number of coverage bits corresponding to the number of samples to a shader thread.

18. The non-transitory computer-readable medium of claim 15, wherein the SRP map is bitmap indicating an absolute shading rate or shading rate change for one or more bits of screen or viewport coordinates.

* * * * *